Figure 1:
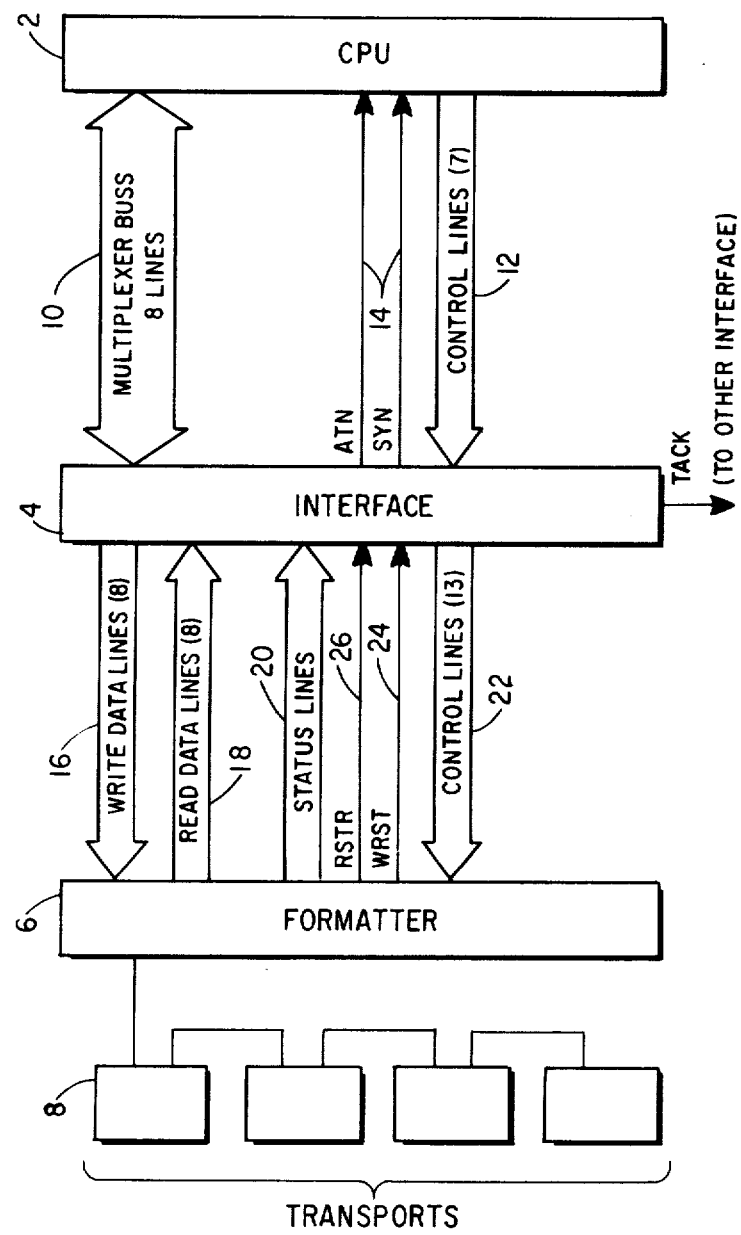

United States Patent [19]

Shanks et al.

[11] 4,054,947
[45] Oct. 18, 1977

[54] COMPUTER TO TAPE DECK INTERFACE

[75] Inventors: John L. Shanks; Everett L. Cox, both of Tulsa; John W. Supernaw, Broken Arrow, all of Okla.

[73] Assignee: Standard Oil Company (Indiana), Chicago, Ill.

[21] Appl. No.: 595,960

[22] Filed: July 14, 1975

[51] Int. Cl.² .................. G06F 3/06; G06K 19/08
[52] U.S. Cl. .................................................. 364/900
[58] Field of Search ................. 445/1; 340/172.5

[56] References Cited

U.S. PATENT DOCUMENTS

| | | | |
|---|---|---|---|
| 3,348,213 | 10/1967 | Evans | 340/172.5 |
| 3,397,389 | 8/1968 | Jennings et al. | 340/172.5 |
| 3,439,342 | 4/1969 | Barton | 364/900 |
| 3,439,344 | 4/1969 | Stanga | 340/172.5 |
| 3,533,071 | 10/1970 | Epstein | 340/172.5 |
| 3,553,649 | 1/1971 | Madge et al. | 340/172.5 |
| 3,654,618 | 4/1972 | Kanda et al. | 340/172.5 |
| 3,731,278 | 5/1973 | Eldridge et al. | 364/900 |
| 3,916,389 | 10/1975 | Winandi et al. | 364/900 |

Primary Examiner—Gareth D. Shaw
Assistant Examiner—Jan E. Rhoads
Attorney, Agent, or Firm—Albert C. Metrailer; Arthur McIlroy

[57] ABSTRACT

An interface for coupling a computer to a plurality of magnetic tape transports, including dual-density transports and combinations of high and low density transports. The interface includes an automatic density selector for detecting the density of data stored on a tape prior to reading and for storing this information for as long as the tape is being used. A read-only memory and other logic circuitry translate computer operating commands into commands readable by a transport formatter. The interface also couples digital data between the computer and the formatter and converts formatter status information into language readable by the computer.

2 Claims, 3 Drawing Figures

COMPUTER TO TAPE DECK INTERFACE

BACKGROUND OF THE INVENTION

This invention relates to circuitry for coupling electronic signals between a computer and a plurality of magnetic tape transports, and more particularly to circuitry for automatically detecting the data density of a selected tape transport.

Magnetic tape is commonly used for storing digital data generated by, or to be read by, a digital computer. Tape transports, or decks, are commercially available from a variety of sources. These commercial units operate at various tape speeds up to and including 125 inches per second. Data density has been standardized to 800 and 1600 bytes per inch regardless of tape speed. At 800 bytes per inch, the NRZI, non-return to zero, method of recording data is used, while at 1600 bytes per inch the PE, phase encoded, method of recording is used. These data recording methods are defined by the American National Standards Institute, 1828 L Street, N.W., Washington, D.C. 20036. Each of these recording methods also requires its own electronic circuitry for encoding and decoding the recorded signals. Tape transports with electronics for either, or a combination of, the two recording methods are available. The manufacturers of tape transports also provide formatters for use with their transports.

A formatter is basically an electronic unit which converts digital data into the proper recording format, that is, NRZI or PE, and controls the recording of data on one or more transports. When a PE formatter, or a dual density formatter operating in PE density, starts recording on a new tape, it generates an ID, identification, burst. The ID burst consists of a series of alternate ones and zeros written on the tape starting before the BOT, beginning of tape, tab and ending past the tab. The presence of an ID burst therefore identifies a tape as a phase encoded tape. The BOT tab is typically a reflective tab sensed optically by the transport to provide a reference starting point. A formatter also typically generates a parity bit with each byte recorded to allow detection of recording errors and, additionally, generates special character, CRCC or LRCC, bytes for detecting errors within an entire record. A complete description of a formatter, designed for use with both NRZI and PE data, may be found in the Operating and Service Manual No. 101985, for Dual Formatter Models F6X8X and F8X8X, produced by Pertec Corporation, 9600 Irondale Avenue, Chatsworth, Calif. 91311.

Although commercially available formatters are compatible with their corresponding tape transports, they are not designed to be controlled by any particular central processing unit. Thus, for example, where it is desired to use a tape transport manufactured by Pertec Corporation in conjunction with a minicomputer manufactured by Interdata Corporation, an interface unit must be provided between the computing unit and the formatter. Some interface units are commercially available, but are typically limited to either NRZI or PE data formats. The few interface units which do operate with both data formats are very expensive and do not provide means for automatically determining the data density of a prerecorded tape placed on a tape transport for reading by the computing unit.

Accordingly, an object of the present invention is to provide an interface for coupling a computing unit of one manufacturer to a magnetic tape transport formatter of a second manufacturer.

Another object of the present invention is to provide a computing unit to tape transport formatter interface capable of coupling both NRZI and PE formatted data.

Another object of the present invention is to provide a computing unit to formatter interface which automatically selects the data format of a prerecorded tape and stores this format information.

Another object of the present invention is to provide a simple and inexpensive computing unit to formatter interface.

An interface according to the present invention comprises input and output buffer coupled to a computer multiplexer bus output, a command translator coupled to the computer output for converting computer commands into commands readable by a formatter, an automatic density selector for searching the beginning of a newly loaded tape for the presence of an identification burst and determining and storing the density of the tape from the presence or absence of such burst, and a status indication translator for converting status bits generated by said formatter into status indications readable by said computer. Substantially all of the circuitry used to form this interface is standard integrated circuit logic cells.

Figure 2:
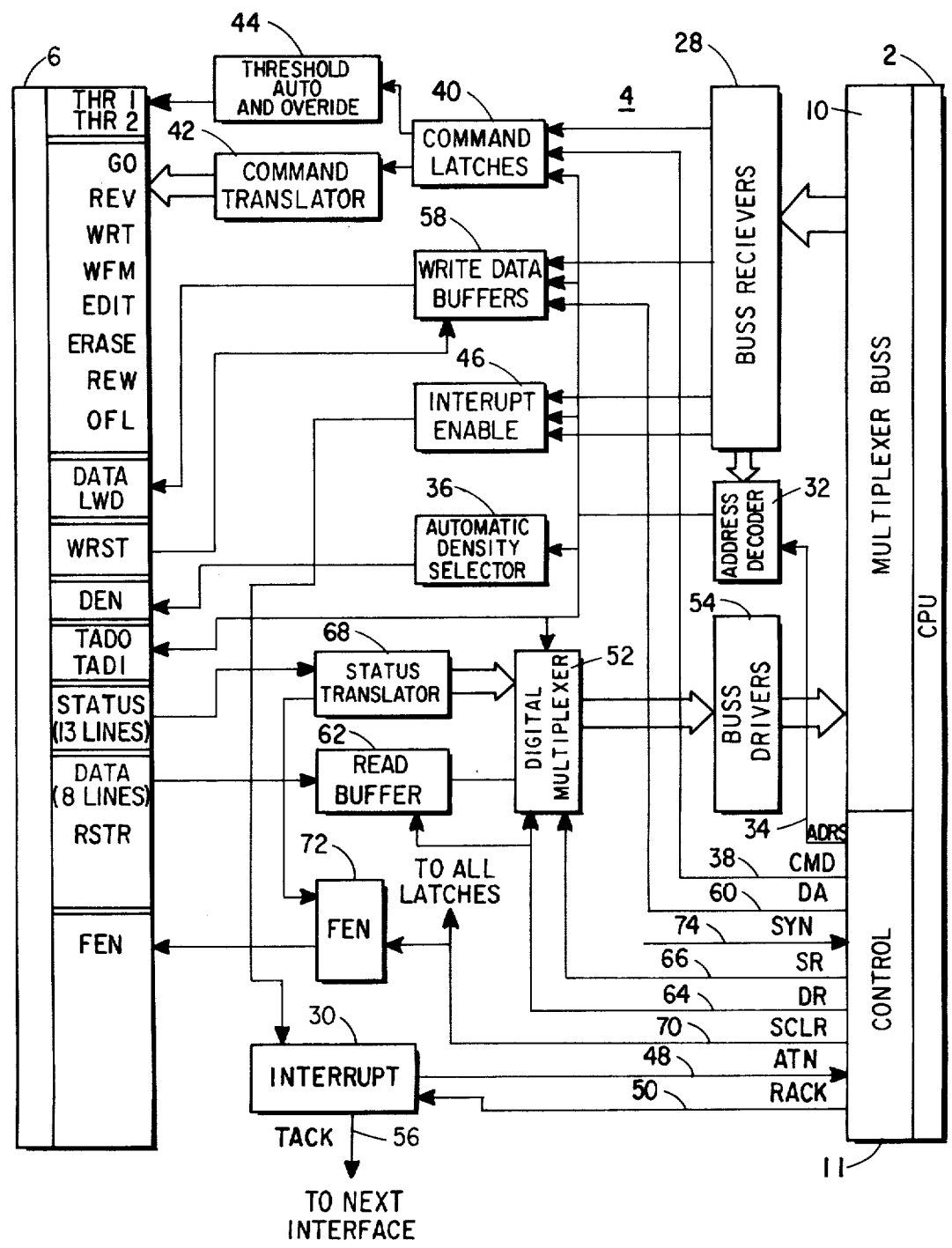
Figure 3:
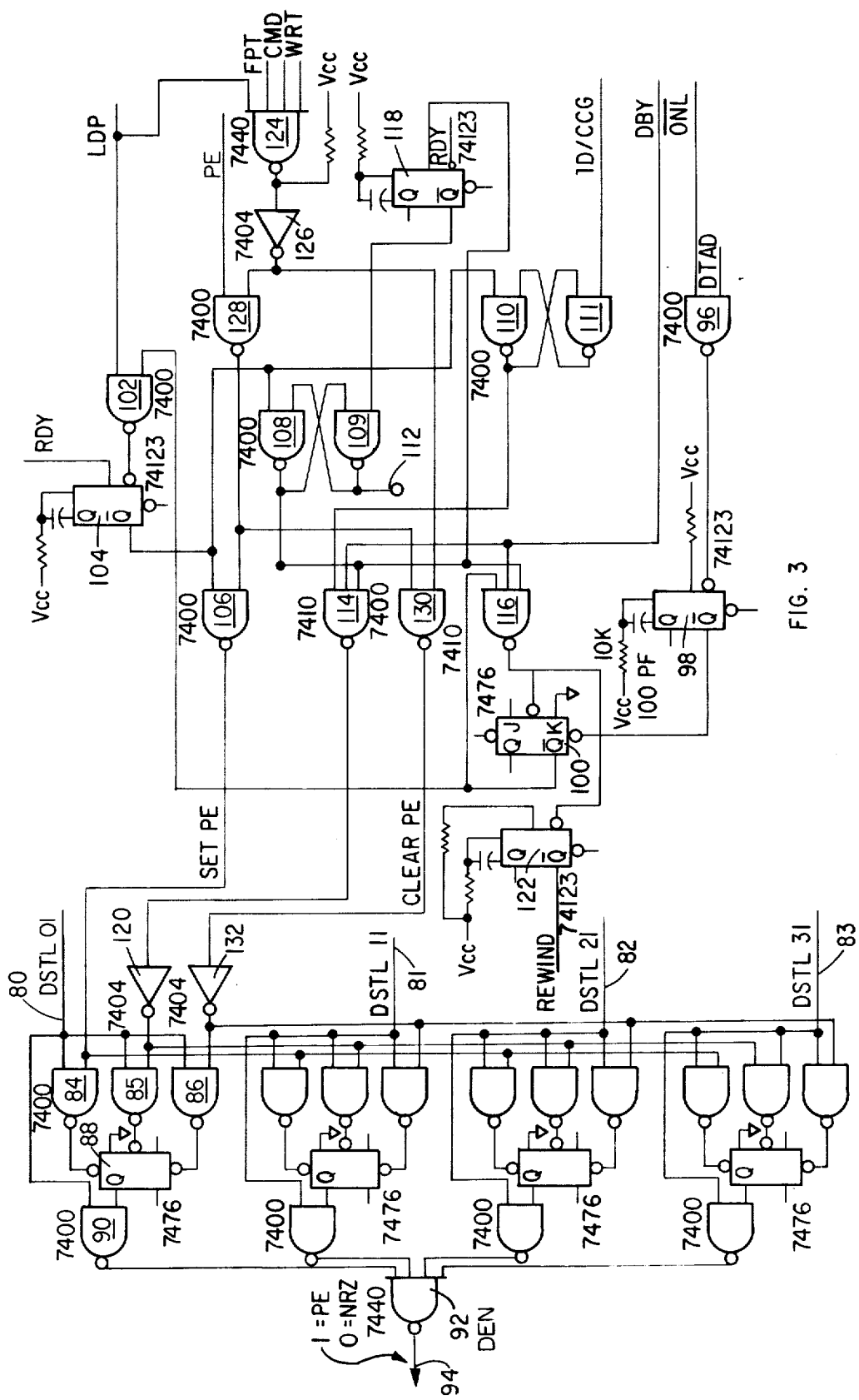

Other objects and features of the present invention may be seen by reading the following detailed description with reference to the accompanying drawings, wherein:

FIG. 1 is a general block diagram illustrating the interconnections between a computing unit and interface according to the present invention and a tape transport formatter;

FIG. 2 is a detailed block diagram of the signal line interconnection between a computing unit, the blocks which makeup an interface and a formatter; and FIG. 3 is a detailed logic diagram of the automatic density selector 36 of FIG. 2. FIG. 1 illustrates generally the interconnections between a CPU, central processing unit, to an interface 4 and a formatter 6, which controls magnetic tape transports 8. The input-output lines of a CPU 2 typically comprise a multiplexer bus 10, control lines 12 for operating peripheral equipment, and control line 14 for receiving control signals from the peripheral equipment. CPU 2 may be, for example and Interdata Model 70 minicomputer. With such a mincomputer, multiplexer bus 10 comprises eight lines which couple a variety of data and information to and from the CPU 2. Bus 10 couples eight-bit data words, eight-bit commands and eight bit of address information on a time-shared basis from the CPU to interface 4. Bus 10 also couples eight-bit data words, eight-bit status information, and the address of interface 4 from the interface to CPU 2, also on a time-shared basis. In contrast, control lines 12 are permanently connected lines used for one control signal each and control a variety of function of interface 4, including the proper time-sharing of the multiplexer bus 10 signal lines. The control lines 14 from interface 4 to CPU 2 are likewise permanently connected single-purpose lines.

Interface 4 operates on the signals received from CPU 2 to generate signals for a larger number of interconnecting lines coupled to a formatter 6 which may be, for example, a Pertec Corporation Model F6484. These lines include write data lines 16 for coupling data information from interface 4 to formatter 6 and read data lines 18 for coupling data word in the reverse direction.

In addition, interface 4 receives a plurality of status lines 20 from formatter 6. Interface 4 also generates signal for control lines 22 for controlling the operation of formatter 6. Formatter 6 generates two control or timing signals 24 and 26 for synchronizing the read and write operations between the interface and the formatter 6. The RSTR, read strobe, line 26 provides a timing signal to interface 4, indicating when a word is ready for reading from formatter 6. The WRST, write strobe, line 24 provides a timing signal to interface 4, indicating when formatter 6 is ready to receive a data word for writing on a tape.

Formatter 6, in turn, controls the operation of transports 8 and translates eight-bit digital data to and from NRZI and PE format in accordance with the control signals received from interface 4. A detailed description of the organization and operation of a formatter 6 is contained in the above-referenced Pertec Corporation Operating and Service Manual.

FIG. 2 illustrates in more detail the organization of interface 4 and its interconnections with CPU 2 and formatter 6. The same designation numbers are used to indicate the blocks and signal lines which correspond to those shown in FIG. 1. The CPU block 2 is subdivided into a portion 10 representing the multiplexer bus and another portion 11 representing the control signal generating and receiving portion of CPU 2. Bus 10 comprises eight wires having a plurality of sending and receiving device coupled thereto. The plurality of sending devices are connected in parallel by means of the wire OR method, that is, each sending device's output is either a short circuit to ground, representing a logic 1, or an open circuit representing a logic 0. Interface 4 includes a set of bus receivers 28, which comprises a set of eight NAND gates, each having one input coupled to a bus signal line. The other input of each NAND gates is internally connected to a signal generated by an interrupt block 30 which allows blocking of the bus receivers during an interrupt cycle when the address of interface 4 is being transmitted back onto muliplexer bus 10.

The outputs of bus receivers 28 are coupled to a plurality of other blocks within interface 4. The multiplexer bus lines are referred to as bits 0 through 7 for reference purposes. All eight bits are coupled to an address decoder 32 which performs essentially three functions upon receipt of an ADRS signal on a control line 34 from control section 11 of CPU 2. Decoder 32 compares bits 0, 4, 5, 6, and 7 to a manually preset address for interface 4. If the address being received on multiplexer bus 10 corresponds to the address of interface 4, decoder 32 stores this information and additionally passes bit 1 to an automatic density selector 36, which stores this bit of information as an indication of whether PE or NRZI coding has been selected by the program within CPU 2 for writing information onto a magnetic tape. Decoder 32 also stores address bits 2 and 3 and couples these two bits to formatter 6 where they are received as signals TAD0 and TAD1. The TAD, transport address, signals are used by the formatter 6 to select which of the four tapes transport controlled by formatter 6 is to be used for the reading or writing operations.

When a CMD, command, signal is received on a control line 38, bits 2 through 7 are stored in a command latch unit 40. Bits 2, 3, 4, 6, and 7 are coupled from command latches 40 to a command translator 42, which comprises a read only memory programmed to convert these five input bits into eight command signals. These eight command signals, GO, REV, WRT, WFM, EDIT, ERASE, REW, and OFL, are all standard Pertec Corporation formatter command, described in the above-referenced Operating and Service Manual. Bits 4 and 5 are coupled from command latches 40 to a threshold automatic and override cell 4 which generates two command signals, THR1 and THR2 for controlling the read threshold of formatter 6. These two signals are also standard inputs for a Pertec Corporation formatter.

When the CMD signal is received on line 38, command bits 0 and 1 are stored in interrupt enable cell 46 which generates an output to either arm or diable interrupt cell 30. When armed, interrupt cell 30 generates an ATN, attention, signal on line 48, in reponse to a NMTN, no motion, status signal generated by interface 4. The NMTN signal is described below with reference to a status translator 68. The function of the interrupt cell is to call the CPU's attention to the fact that formatter 6 has completed a previouly ordered read, write or rewind cycle. The ATN line 48 is wire OR'd with other ATN lines from other peripheral units so that CPU 2 does not know directly with peripheral is issuing the ATN signal. The CPU 2 determines which unit issued the command by issuing a RACK, received acknowledge, signal on a control line 50 which is coupled to all peripheral units in a daisy-chained fashion. If interrupt cell 30 actually issued the ATN signal 48, then, upon receipt of the RACK signal, it disables the bus receivers 28 and causes the interface 4 address to be coupled back to the multipexer bus through a digital multiplexer 52 and a set of bus drivers 54. CPU 2 then can read the address on the multiplexer bus 10 and know which peripheral issued the ATN signal 48. If interrupt cell 30 has not issued an ATN signal, then, upon receipt of an RACK command 50, it passes the signal on to the next interface on control line 56, labeled TACK.

All eight bits of bus receiver 28 information are coupled to write data buffers 58 and stored therein when interface 4 has been properly addressed and a signal is received on the DA, data available, control line 60. Buffer cell 58 is a triple buffer comprising 24 latches and therefore stores up to three words ready for writing onto a tape. When a word is coupled into buffers 58 from the CPU, it is automatically transferred to the last empty buffer. When all three buffers are full, a BSY, busy, status is coupled back to the CPU which inhibits any further data transfers to the write date buffer 58. When the selected tape transport is up to speed and ready to write data, it generates a WRST, write strobe, signal which is coupled to write data buffers 58. This WRST signal causes the data in the first and second write data buffers 58 to shift into the second and third buffers, respectively, after the data in the third buffer has been written on the tape. When this data shift occurs, the first buffer is empty, the BSY status changes, and the CPU is able to write one more word if it has additional data to transfer. When the CPU has tranferred all of its data and the write strobe signal has shifted the last word of data into the third buffer, write data buffer cell 58 senses the fact that the first two buffer are empty and generates a LWD, last word, signal, which is coupled to formatter 6. The last word signal is another standard input for a Pertec Corporation formatter and signals the formatter that it has reached the end of a record. This method of transferring data from CPU 2 to formatter 6 is compatible with tranports operating at any tape speed and with both NRZI and PE formatted data. A read buffer 62 operates in a similar fashion to transfer data from formatter 6 to CPU 2. The eight standard data lines from formatter 6 are coupled to a read buffer 62, which comprises one set of eight latches. These latches store the data presented to read buffer 62 when an RSTR, read strobe, pulse is received from formatter 6. When data are thus stored in read buffer 62, the BSY status bit coupled to CPU 2 changes state, indicating that the interface is no longer busy reading data from the formatter 6. When this occurs, the CPU 2 generates a DR, data request, pulse on a control line 64 which causes digital multiplexer 52 to couple the data stored in read buffer 62 through the bus drivers 54 and to the multiplexer bus 10 of CPU 2. The DR pulse also causes the BSY status bit to return to the state which indicates that the interface is bust reading data from the formatter and it remains in this state until another RSTR signal is received from formatter 6. This method of reading data from a tape and coupling it to a CPU 2 functions properly with both NRZI and PE format data and with tape transports operating at any standard tape speed.

For both the read and write operations described above, it is presumed that the interface 4 had been properly addressed and commanded for the read or write operation, respectively.

The digital multiplexer 52, which is used to couple the read data from read buffer 62 to bus driver 54, comprises a set of eight four input multiplexer logic cells. The output of each cell is coupled to the input of a driver gate in bus driver cell 54. The multiplexer cells are addressed by two inputs generated from the DR, data request, control line 64, the SR, status request, control line 66, and an internally generated signal coming from the interrupt cell 30. The addresses generated by these three inputs causes the multiplexer 52 to couple read data, eight status bit signals, or the interface 4 address to the bus drivers, respectively. The fourth available input to each multiplexer cell is grounded so that the cell outputs are a logical 0 when none of the three above outputs are called for.

The status translator 68 receives 13 of the standard status indication lines from formatter 6. The names of these signals and the meaning of a true logic level on each line are as follows:

FBY, the formatter is busy;
DBY, the formatter is performing either a read or write operation;
CCG/ID, the data being presented to the interface is a CRCC or a LRCC, if an NRZI tape is being read, or is an ID burst if a PE tape is being read;
HER, a noncorrectable error has been detected;
CER, an error has been detected and is being corrected;
FMK, a file mark has been detected;
RDY, the selected transport is ready to accept commands;
ONL, the selected transport can be remotely controlled;
LDP, the selected transport is at the load point;
EOT, the selected transport is at the end of a tape;
NRZ, the selected transport is an NRZI format unit;
SGL, the selected transport has a single-stack head; and
FPT, the tape on the selected transport is file-protected.

These status bits and an additional three others, which are not used by interface 4, are listed and more fully described in the above-referenced Pertec Corporation Operating and Service Manual. Status translator 68 receives these status indications from the formatter and, in addition, receives internally generated status indictators to generate and eight-bit status word corresponding, in the preferred embodiment, to status indicators readable by a standard Interdata Model 70 operating system. The names of these eight status bits, their meaning, and their source are as follows:

0 ERR, a HERO, or CERO during write operation, or overflow (CPU attempts to resume reading in a record after it stopped reading), or an error has been detected while writing;
1 EOF the formatter FMK status bit has gone true;
2 BOT/EOT the formatter LDP or EOT status bit has gone true;
3 NMTN tape is not moving and formatter is ready to receive a new command, determined from formatter FBY and RDY status bits;
4 BSY the interface write data buffers are full while transports are busy writing, or the interface read data buffer is busy reading data from the transport (when BSY goes false, the CPU can write or read it next data bit);
5 EX formatter FMK status or FPT is true or the interface NMTN status if true;
6 EOM goes true when formatter DBY goes true, is cleared by CPU signals SCLR or CMD and by formatter RDY;
7 DU same signal as formatter ONL.

The CPU 2 provides a SCLR, system clear, signal on a control line 70 which is coupled to all latches within interface 4 to reset the interface in preparation for receiving a new operating command. The SCLR signal is also supplied to a formatter enable generating block 72 which generates a FEN pulse required by the formatter 6 for resetting whenever it returns to the load point. Formatter enable block 72 receives the formatter status signals DBY, FBY, and LDP from status translator 68 and generates a FEN pulse whenever all three of these formatter status bits are true or whenever an SCLR pulse is received from CPU 2 on control line 70.

An additional signal is provided by interface 4 to CPU 2 as an acknowledgement of the receipt of a control line signal by interface 4. This signal, labeled "SYN", is generated on control line 74 by the interface whenever it is properly addressed and an ADRS, CMD, DA, SR, DR, and RACK control signal is received from the CPU 2.

FIG. 3 illustrates in detail the digital circuity comprising automatic density selector 36 of FIG. 2. Most of the input and output signal lines appearing in FIG. 3 are labeled with the same designation names which appear in FIGS. 1 and 2. The remaining signal lines are generated or used internally within interface 4 and the signals are decribed in detail below.

The automatic density selector of FIG. 3 performs three basic functions. The first function is to detect the format of material recorded on a tape when the selected transport is at load point and the formatter generates on ONL signal or the selected transport address is different from the previously selected transport address. The second basic function is to store this format information in a flip-flop assigned to the particular transport. This stored information then controls the selected density for reading from this particular tape as long as it remains addressed and is not taken offline and placed back online. The third basic function is to store the density information contained in the address whenever a write command is directed to a particular transport which is also at load point. The write density selection information is received as bit 1 of the address transferred from address decoder 32 of FIG. 2 to automatic density selector 36. Once this write density information is stored in the flip-flop assigned to a particular transport, it also remains there until that transport returns to load point and is either taken offline and placed back online, or is re-addressed after another transport has been addressed. Thus, it is seen that the automatic density selector may cycle through a density selection step when a tape is addressed for writing only because interface 4 must be properly addressed before a write command can be received and the density selection begins when the tranport is addressed.

As described above with reference to FIG. 2, address decoder 32 stores address bit 2 and 3 and supplies these to formatter 6 as transport address signals TAD0 and TAD1. Address decoder 32 additionally decodes bits 2 and 3 to generate four signals designated DSTL01, DSTL11, DSTL21, and DSTL31. These four deck select lines are coupled to automatic density selector input lines 80 and 83, respectively. Only one of these four lines is at logical 1 level at any given time and, for the purposes of this description, it is assumed that DSTL01 is at a logical 1 level and only the function of the circuitry activated by this signal is described for simplicity. The DSTL01 line is coupled to one input each of NAND gates 84, 85, and 86, which have outputs coupled to the set, toggle and reset inputs, respectively, of a flip-flop 88. The DSTL01 line 80 is also coupled to one input of a NAND gate 90, which has a second input coupled to the Q output of flip-flop 88. When line 80 is high, gate 90 couples the Q output from flip-flop 88 to an input of a NAND gate 92 which OR's the outputs of NAND gate 90 and three corresonding NAND gates coupling density information for each of the other three transports. The output of NAND gate 92 which appears on signal line 94 is the DEN control input coupled to formatter 6.

When interface 4 is properly addressed, the automatic density selection sequency is initiated by the receipt of one of two signals at the two inputs of a NAND gate 96. One of these signals is the inverse of the ONL status line received from formatter 6. This input indicates that the selected transport is now online after having been placed offline, which generally means that a new tape has been placed on the transport. The other input, labeled DTAD, is a signal generated within the address decoder 32 of FIG. 2, and indicates that either one or both of the presently received TAD signals is different from the previously received signal. When NAND gate 96 receives either of these inputs, its output causes a one-shot 98 to generate an output pulse which resets a flip-flop 100. The ouput of flip-flop 100, in turn, activates a NAND gate 102, which couples the LDP status bit from formatter 6 to a trigger input of a one-shot 104. A second input of one-shot 104 is coupled to the formatter status bit RDY, and, if RDY is true, one-shot 104 generates an ouput pulse. The output one one-shot 104 is coupled to an input of a NAND gate 106 which performs and OR function and couples this signal, designated SET PE, to an input of NAND gate 84, which,in turn, sets flip-flop 88, thereby causing the DEN control line to formatter 6 to go true.

The output pulse from one-shot 104 is also coupled to the inputs of two latches. The first of these latches comprises NAND gates 108 and 109 and it stores information indicating whether automatic density selector 36 is in a density select cycle. The second of these latches comprises NAND gates 110 and 111 and stores information indicating whether an ID burst is detected by the transport during a density select cycle. The output of NAND gate 109 is connected to a control line 112, which is coupled to output buffer gate within the command translator 42 of FIG. 2, and forces the translator output into a read forward operation. The output of NAND gate 108 activates NAND gates 114 and 116, and enables a one-shot 118.

If an ID burst is detected by the selected transport when it begins reading, the control input of NAND gate 111 goes low, therebycausing the output of NAND gate 110 to go low, and disable NAND gate 114. This occurs when the tape on the selected transport is a PE tape and the stored PE condition in flip-flop 88 remains unchanged. If no ID burst is detected, the output of NAND gate 110 remains high and NAND gate 114 remains enabled. When the selected transport reaches full operating speed, the DBY status bit goes true, and, if no ID burst was detected, this status bit causes a change in the output of NAND gate 114, which is coupled through an inverter 120 to NAND gate 85 which causes flip-flop 88 to toggle, and thereby cause the DEN control line to go false, indicating that the tape on the selected transport is NRZI format.

The occurence of a change in the DBY status bit also causes a change in the output of NAND gate 116, in turn, toggles flip-flop 100, thereby preventing a recurrence of the density select cycle when the transport rewinds to load point. This change in the output of 116 also triggers a one-shot 122, which generates a rewind command which is OR'd with the rewind command from command translator 42 before being coupled to formatter 6, and therefore causes the tape transport to rewind to load point. When the selected transport has rewound to load point and is ready for a new command, the formatter status bit RDY changes state and cause one-shot 118 to generate a pulse which is coupled to an input of NAND gate 109. This pulse resets the latch comprising NAND gates 108 and 109 to indicate that the density select cycle is over, and this, in turn, disable NAND gates 114, 116 and the one-shot 118, and enables the output buffers of command translator 42 of FIG. 2 to couple the last received command to formatter 6.

A four-input NAND gate 124 receives the LDP and FPT status bits from the formatter 6, the WRT control line generated by interface 4, and the CMD pulse received from the CPU 2. Gate 124 therefore generates an output pulse when the selected transport is not file-protected, is at load point, and a write instruction has been received. The output of NAND gate 124 is coupled through an inverter 126 to one input each of NAND gates 128 and 130. A second input of NAND gate 128 receives the PE control line, address bit 1, from the address decoder 32 of FIG. 2, and if the PE line is true, couples the pulse from inverter 126 through NAND gates 106 and 84 to the set input of flip-flop 88, thereby setting the DEN control line 94 to true level. If the PE input to NAND gate 128 is low, the output of NAND gate 128 is high, and, in turn, enables NAND gate 130 to couple the pulse from inverter 126 to an inverter 132, which couples the pulse through NAND gate 86 to the reset input of flip-flop 88. When flip-flop 88 is thus reset, it causes the DEN output line 94 to have a false level, indicating NRZI format.

Although the present invention has been described in terms of specific circuitry, it is apparent that modifications and substitutions of parts can be made within the scope of the invention, as defined by the appended claims.

We claim:

1. In an interface for coupling data and control signals from a computer to a formatter which controls a dual density magnetic tape transport and for coupling data and status information from the formatter to the computer, the improvement comprising:

density storage means for storing an indication of magnetic tape data density, said storage means having a output coupled to said transport for controlling data density of read and write operations of said transport in accordance with the stored indication, and having a first input coupled to said computer for receiving density indications for write operations, a second input for receiving a signal causing said storage means to store an indication of a phase encoded format density, and a third input for receiving a signal causing said storage means to store an indication of non return to zero format density, initiation means having inputs coupled to the computer and to the formatter, said inputs adapted to receive address signals from said computer and status signals from said formatter including on-line and load point status signals, said initiation means further having an output coupled to said density storage means second input for providing a density selection signal in response to the receipt of signals at the inputs indicating that: (1) a transport address has been issued by the computer; and (2) a tape on the addressed transport is at its load point position; and (3) either the issued address is different from the last address issued by the computer or, the addressed transport is placed on-line;

a read forward command generator having an input coupled to the output of said initiation means and an output coupled to said formatter for, in response to receipt of a density selection signal, providing a read forward command causing said transport to read a magnetic tape; and, density indication modifying means having an input coupled to said initiation means output and inputs coupled to said formatter for receiving status signals, including an identification burst status signal indicating that a tape is in phase encoded format density and a device busy status signal indicating that the transport is at operating speed, and having an output coupled to said density storage means third input for providing a density change signal in response to receipt of a density selection signal followed by receipt a device busy signal without receipt of an identification burst signal.

2. In an interface according to claim 1, the further improvement comprising:

rewind means having a first input coupled to said initiation means output and a second input coupled to said formatter for receiving the device busy status signal and an output coupled to said formatter for, in response to receipt of a device busy status signal after receipt of a density selection signal, providing a rewind command causing said transport to rewind the magnetic tape.

* * * * *